United States Patent Office 2,717,809
Patented Sept. 13, 1955

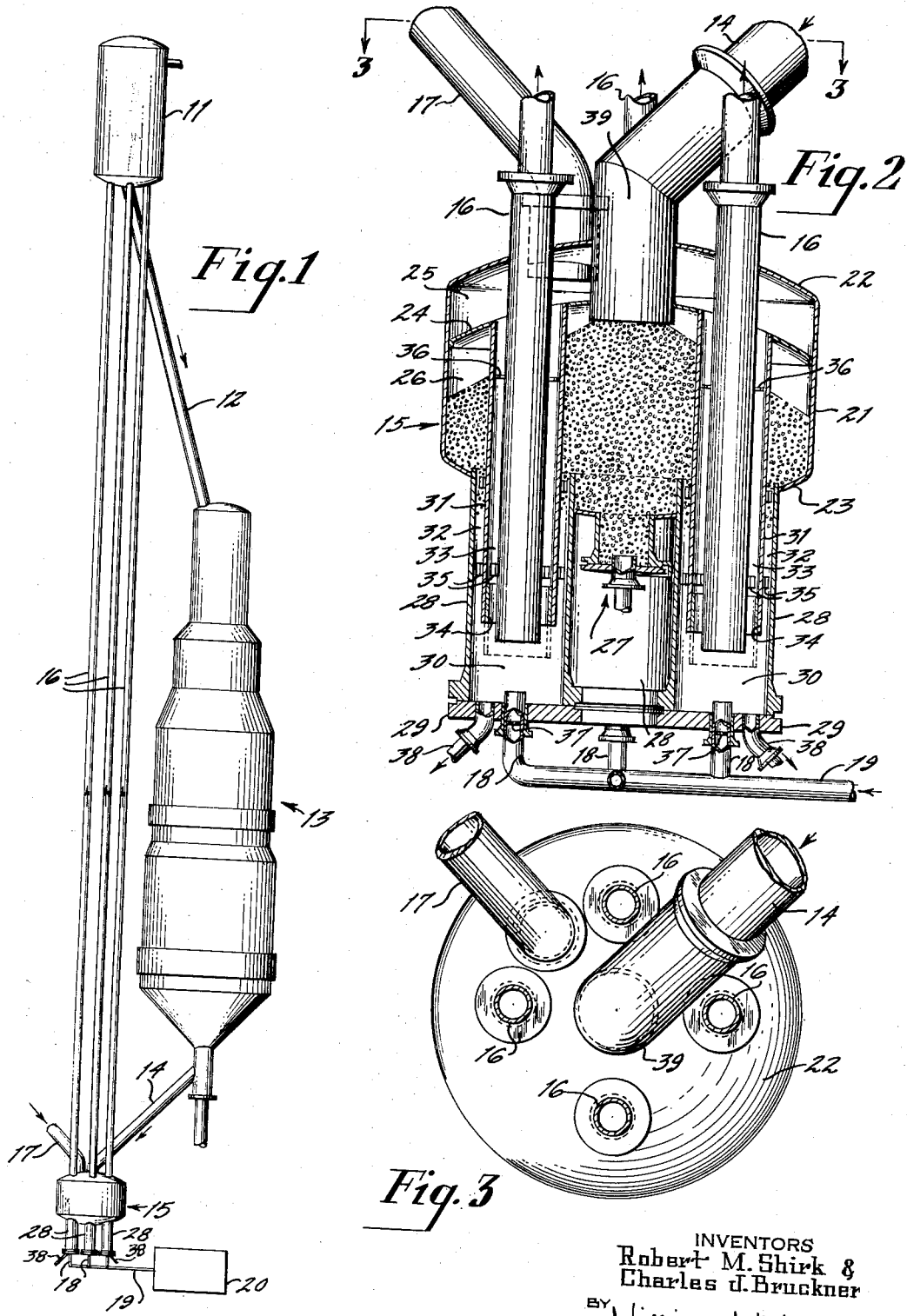

2,717,809
MULTIPLE LIFT FOR ELEVATING GRANULAR SOLIDS

Robert M. Shirk, Wilmington, Del., and Charles J. Bruckner, Drexel Hill, Pa., assignors to Houdry Process Corporation, Wilmington, Del., a corporation of Delaware Application November 1, 1949, Serial No. 124,874

10 Claims. (Cl. 302—53)

This invention relates to a method and apparatus for elevating granular solid material by suspension in a rising gaseous stream or gas lift, and is particularly adapted for use in systems commonly employed in the chemical processing and oil refining industries wherein particulate solid material is passed through one or more processing or contacting zones in a cyclic procedure, the granular solid material functioning, for example, as a catalyst or as a contact material for other desirable purposes.

The invention is especially applicable to systems involving the catalytic conversion of petroleum, and for the purpose of illustrating the invention in one of its preferred applications it will be described hereinafter in connection with a catalytic cracking system for the conversion of hydrocarbons in the production of motor gasoline in which the solid material is of a catalytic nature and is employed in the form of relatively large aggregates or agglomerated masses, such as pellets, beads, coarse granules or the like having a particle size in the range between 0.05 and 0.5 of an inch, or having, for example, an average particle size in the order of 14 mesh or larger.

In systems employing catalyst in the size range above-mentioned the catalyst is commonly withdrawn from an elevated source of supply and passed downwardly by gravity flow in the form of a compact moving bed through one or more zones wherein the catalyst is contacted with the hydrocarbons to carry out the desired reaction, or wherein the catalyst itself is treated, as in a regenerator or kiln, to condition it for further use, and is then discharged at a lower point from the treating zones. The catalyst is then elevated to the supply hopper and recycled through the system.

Various methods and means for returning the catalyst to the elevated source of supply, or upper hopper, are well known, such as by conveying the material upwardly in a mechanical conveyor comprising an endless chain of buckets. A typical system involving the gravitational passage of granular catalyst as a moving non-turbulent bed through contact zones, and the subsequent elevation of the catalytic material from its point of discharge to its initial elevated position by means of mechanical elevating means, is discussed generally in an article entitled "The T. C. C. catalytic cracking process for motor gasoline production" by R. H. Newton, G. S. Dunham and T. P. Simpson, recorded in the "Transactions of the American Institute of Chemical Engineers," volume 41, page 215, April 25, 1945, and in other articles therein cited.

Mechanical lifts have the disadvantages of initial high cost, limited capacity, and excessive wear because of the difficulty in maintaining proper lubrication of moving parts at the high temperature employed. An additional disadvantage is that special provision must be made for the considerable stretching of the bucket chain in a high lift.

It has been proposed to overcome these and other disadvantages inherent in mechanical lifts operating through relatively long vertical distances, such as those required in oil refinery installations, by the substitution of pneumatic lifts. In a typical pneumatic lift, solid catalytic particles withdrawn by gravity flow from the lowermost treating or contact zone are introduced into an engaging gaseous stream and conveyed upwardly by suspension therein through a vertical lift pipe to an elevated separating zone. The solid particles are separated from the gas stream within the latter zone and are then passed downwardly again through the various treating zones in a cyclic procedure. The invention will hereinafter be described particularly in connection with the latter type of system, a fuller description of which is given in an article entitled "Houdriflow: New design in catalytic cracking" appearing at page 78 of the January 13, 1949, issue of the "Oil and Gas Journal." This design comprises, briefly, a superimposed self-supporting circular reactor and regenerator section through which the catalyst, in the form of beads or pellets, is passed by gravity flow. The catalyst is supplied to the system from an upper lift hopper disposed at an elevation substantially above the combined reactor and regenerator section and, after discharging from the latter, the catalyst is passed downwardly into a lower lift hopper. The lower lift hopper includes an engaging zone in which the catalyst is introduced into a stream of gas, such as flue gas, air, steam, etc. and conveyed thereby upwardly through a lift pipe to the upper lift hopper, which includes a disengaging zone for separating the catalyst from the lift gas. In the above-cited article, the illustration shows the catalyst being elevated through a single lift pipe. While the single lift pipe may be sized in accordance with catalyst circulation requirements, it may in a particular case be desired to attain a relatively high catalyst circulation rate by the use of a plurality of lift pipes of smaller diameter instead of a single large diameter lift pipe, the lifts operating out of a common source of catalyst supply.

A multiple lift system, however, introduces the problem of maintaining substantial uniformity of operation in each of the several lift pipes, especially when the latter withdraw the granular catalyst from a common moving bed, and lift gas is introduced to each of the several lift pipes from points within the bed adjacent the lower ends of the lifts. Experience has shown that for various reasons minor fluctuations in catalyst flow within the lifts are inevitable during normal operation. Uniformity of operation is dependent in large part upon the maintenance of a substantially uniform pressure drop between the source of lift gas and the entrance at the lower end of each lift pipe, as well as within the lift itself. When the lift pipes are closely grouped with their lower ends dipping into a common moving bed of granular material, it is necessary to guard against an increase in pressure at the lower end of any lift pipe, such as might be caused by catalyst accumulation therein, causing the lift gas to migrate from the lift region at which it is introduced toward the lower ends of adjacent lift pipes where there are zones of lower pressure. Under such circumstances, the diversion of lift gas from the faulty lift would cause the disruption to be cumulative in effect and might eventually interrupt all flow of catalyst in that single lift, thus upsetting the entire operation of the lift system.

In accordance with the present invention, the lower ends of the lift pipes are submerged within the moving bed of catalyst and the lift inlets are so arranged that any migrating lift gas passing from the zone of catalyst engagement adjacent one lift inlet to the corresponding zone adjacent another lift inlet must necessarily travel through the moving bed a distance sufficient to provide a substantial pressure drop between the zones. The magnitude of this pressure drop is preferably substantially in excess of the maximum pressure fluctuation which may normally be expected to occur in a lift, so that, before operation of the lift is seriously affected, corrective measures may be automatically applied or self-stabilization may occur.

To further insure stability of operation, the invention contemplates a uniform distribution of lift gas to the zones of catalyst engagement at the lift inlets. To this end, the lift gas is supplied in separate streams from a common source maintained at a substantially uniform pressure and is distributed uniformly to the several lift pipes. A sufficient pressure drop is provided in each stream of lift gas between the common source and the point of discharge at the lift inlet to maintain such uniform distribution and to prevent reverse flow as a result of pressure increase at the lower end of the lift.

A fuller understanding of the novel method of this invention and of suitable means for carrying it out may be had by reference to the following description and claims taken in connection with the accompanying drawing forming a part of this application, in which:

Fig. 1 is a schematic view in elevation of the essential parts of a typical catalytic cracking system embodying the improved lift design;

Fig. 2 is an enlarged sectional view of the engaging zone of the gas lift; and

Fig. 3 is a plan view as indicated by the line 3—3 of Fig. 2.

Referring to the drawing, a preferred embodiment of the invention has been shown in connection with a typical catalytic cracking unit for the conversion of hydrocarbons. Since the invention is directed primarily to that portion of the system in which the catalyst, after passing downwardly through the treating zones, is continuously elevated for reuse in the system, and since the operation and construction of the hydrocarbon and catalyst treating units are adequately described in the aforementioned article appearing in the "Oil and Gas Journal," detailed illustration and description of the latter have been omitted for the sake of brevity.

Referring to Fig. 1 of the drawing, granular catalyst is continuously withdrawn from the bottom of an upper lift hopper, designated by the numeral 11, and is passed by force of gravity downwardly through a seal leg 12 to the upper end of a combined reactor-regenerator or reactor-kiln, generally indicated by the numeral 13. In passing through the reactor-regenerator 13 the catalyst gravitates downwardly as a compact moving mass, passing successively through a zone in which the catalyst is contacted with hydrocarbon vapors under conditions effective to produce the desired conversion, a zone in which the gaseous products of conversion are separated from the catalyst, which has become contaminated by a deposit of coke thereon, a zone in which the carbonaceous deposit is removed from the catalyst, as by combustion, and a zone in which the catalyst is separated from the gaseous products of combustion.

The reactivated or regenerated catalyst is withdrawn from the bottom of the reactor-regenerator 13 into a seal leg 14, through which it passes to a lower lift hopper, generally indicated by the numeral 15. Within the hopper 15 the catalyst gravitates as a moving bed through an engaging zone, at the bottom of which it is distributed uniformly to the open lower ends of a plurality of lift pipes 16, four being illustrated, although fewer or more may be employed. A gaseous medium, such as flue gas, steam, air, etc., for effecting elevation of the catalyst through the several lift pipes 16 is introduced to the lower lift hopper 15 through the gas inlet line 17 entering the upper end of the lower lift hopper and the gas inlet lines 18 entering the bottom of the lower lift hopper. Inlet lines 18 are supplied through line 19 with gas from a source 20, preferably maintained at constant pressure.

The details of the lower lift hopper 15 are clearly illustrated in the enlarged drawing of Fig. 2, wherein the hopper is shown as comprising a cylindrical body member 21 having upper and lower dished heads 22 and 23, respectively. A transverse partition 24 in the upper portion of the vessel defined by the members 21, 22 and 23 separates the vessel into a plenum chamber 25 and a catalyst engaging zone 26.

In the central portion of the lower dished head 23 the usual man-hole and catalyst drain, generally indicated at 27, are provided. Depending from the bottom of dished head 23, and equi-spaced along a path concentric to the body member 21, are four elongated pipe sections 28 closed at their lower ends by cover plates 29 removably secured thereto in any conventional manner. The pipe sections 28 form a plurality of elongated or deep wells 30, which form segregated extensions of the catalyst engaging zone 26.

A correspondingly plurality of pipe sections 31 secured at their upper ends to the transverse partition 24, and in open communication with the plenum chamber 25, depend concentrically within the pipe sections 28, the respective diameters of the pipe sections 28 and 31 being such as to provide a free path 32 therebetween for the passage of catalyst from the upper enlarged portion of the engaging zone 26 to the lower region of the wells 30 formed by the pipe sections 28.

The lift pipes 16 extend downwardly through the upper dished head 22 and the transverse partition 24 and pass concentrically through pipe sections 31 to a point below the lower end thereof, thus providing an annular space 33 therebetween for the passage of lift gas. The pipe sections 31 thus form sleeves encircling the lift pipes. The lower ends of pipe sections or sleeves 31 are provided with short extensions or liners 34 snugly fitted within the lower ends thereof. It has been found that the vertical distance between the lower end of the pipe section 31 and the lower end of lift pipe 16 has a noticeable affect on the flow characteristics of the lift, and, for this reason, the extension 34 has been provided. The extension is initially set in accordance with predetermined lift requirements, and subsequently it may be raised or lowered to vary the sleeve height, which arbitrarily designates the distance between the lower ends of the sleeve and the lift pipe. The extension may be bolted or tack-welded to the lift pipe to facilitate removal. Concentricity between the lift pipes 16 and the depending pipe section 31 may be maintained within the pipe sections 28 by suitable lugs 35 attached at spaced points to the outer surfaces of both lift pipes 16 and pipe sections 31, the lugs being free of the opposite pipe surfaces to allow for differential expansion of the various members.

A substantial pressure drop is introduced within annular space 33 so that pressure changes in the region about the lower end of one lift will not be reflected at other lifts. This may be done by constricting the flow area at some intermediate point in the annular path, such as by an annular orifice ring 36.

The gas inlet lines 18 extend centrally through the cover plates 29, their discharge ends being so positioned below the ends of lift pipes 16 so that a gas, such as steam, may be introduced in the lower region of the wells 30 and directed axially upward into the open ends of the lift pipes through a mass of catalyst. Within each gas inlet 18 an orifice 37 may be provided to assure even distribution of gas from source 20. At each side of the cover plates 29 drain outlets 38 may be provided so that catalyst may be drained from the lower lift hopper through the bottom of wells 30.

Catalyst from seal leg 14 is introduced to the lower lift hopper 15 through catalyst inlet 39 centrally positioned in dished head 22. The inner end of catalyst inlet 39 passes downwardly through the plenum chamber 25 and transverse partition 24, terminating in the upper portion of engaging zone 26.

Lift gas, which may be flue gas or any other suitable gas, is introduced into chamber 25 by means of inlet pipe 17, connected to a source, not shown. If flue gas is to be used as the lifting medium, suitable connections may be provided between inlet pipe 17 and the flue gas outlets from the regenerator or kiln portion of vessel 13.

The catalyst discharging from the vessel 13 through conduit 14 is introduced into the engaging zone of the lower lift hopper 15 through inlet 39, centrally located in the upper end of the hopper in order to obtain the maximum uniformity of catalyst feed to the lift pipes 16 distributed in a concentric path about the inlet 39. The lower lift hopper 15 is so constructed that a compact non-turbulent moving bed of catalyst is constantly maintained within the engaging zone 26. The compact moving bed of catalyst passes downwardly from the enlarged portion of zone 26 through the annular portion 32 of wells 30. A primary flow of lift gas is introduced to the plenum chamber 25 at the upper end of lower lift hopper 15 through inlet conduit 17. From chamber 25 the lift gas is distributed uniformly to each of the pipe sections 31, passing downwardly in the annular space 33 between the lift pipe 16 and the sleeve. The lift gas discharging from the lower end of sleeve 31 reverses its direction in the lower region of the well 30 and passes upwardly into the lift pipe 16, carrying with it by entrainment particles of catalyst discharging from the annular space 32 and passing under the lower edge of the extension 34. A secondary gas, such as steam, may be introduced into each well 30 through its associated inlet 18 and injected axially upward toward the lower end of the lift, where it joins the mixture of primary lift gas and catalyst particles entering the lift pipe. The catalyst is conveyed upwardly by the combined gas streams through lift pipe 16 into the upper lift hopper 11, wherein the usual disengaging means may be employed for separating the catalyst from the gaseous streams.

Fluctuations in the operation of any lift may cause either an increase or a decrease in pressure at the lower end, and it is possible that the pressure at the lower end of one lift may increase simultaneously with a decrease in pressure at the lower end of an adjacent lift, thus tending to accelerate migration of gas from the first to the second. If the annular space 33 is so wide as to produce a negligible pressure drop therethrough, the absence of a constriction, such as provided by the orifice ring 36, may permit undesirable distribution of gas to the various lifts. For example, a substantial pressure increase at the lower end of one lift would decrease the flow of gas from the chamber 25 downwardly through annular space 33, in which case an increased flow from the chamber 25 would be directed to all the other lifts. A further increase in pressure might even reverse the direction of flow through annular space 33, in which case gas admitted through inlet 18 of the faulty lift would pass upwardly into the plenum chamber 25, supplementing the flow of gas to the other lifts. The orifice 36, or other restriction provided in the annular space 33 introduces a sufficient pressure differential therein to cope with lift fluctuations within a predetermined range, the magnitude of the pressure drop being previously set in accordance with the particular operating conditions desired.

Since gas migration through the annular spaces 33 is effectively hindered, in the manner just described, a substantial pressure differential between adjacent lift inlets will cause the gas at the inlet of higher pressure to seek other paths for migration to the inlet of lower pressure, such as upwardly through the annular space 32 containing the downwardly moving mass of catalyst, laterally across the main bed portion of catalyst, and downwardly with the catalyst through the adjacent annular space 32. By providing substantial elongation of annular passages 32 between the sleeves 31 and the pipe sections 28, a sufficient total pressure drop may be introduced by the mass of catalyst in the passages and in the main bed to eliminate the possibility of any serious gas migration. It is contemplated that the pressure differential introduced into the annular spaces 33 by mechanical constriction and in the annular spaces 32 by the presence of catalyst will provide sufficient resistance to migration so that time will be allowed for any adverse condition within the lift to correct itself. Should a fluctuation of sufficient magnitude occur in any lift to cause substantial gas migration upwardly through the space 32, despite the pressure drop introduced by the presence of the compact moving mass of catalyst therein, the flow of gas upwardly countercurrent to the catalyst flow should impede the latter sufficiently to permit self-balancing of conditions within the lift to occur.

In a preferred mode of operation, a primary flow of lift gas is introduced through the annuli 33, and a secondary portion of the total gas flow is introduced through the inlets 18 to the lower region of wells 30. The gas distribution between the primary and secondary streams, and the sleeve height, previously defined, are primary factors in controlling the rate of catalyst flow through the lift, the former being in the nature of a process control, and the latter a mechanical control for determining the catalyst flow rate. For uniformity of operation, it is desirable to maintain an equal distribution of gas between all the streams constituting the primary flow and between all the streams constituting the secondary flow. As shown in the drawing, the secondary gas is introduced through inlets 18, each supplied by conduit 19 from a common source 20. An orifice 37 inserted in each of the inlets 18 introduces sufficient pressure drop in each inlet to produce the effect of an individual supply of gas to each inlet and to insure uniform distribution to other inlets, when one inlet is subject to pressure fluctuation.

While the apparatus for carrying out the invention has been illustrated in but one form, it is obvious that it is susceptible to various changes and modifications within the broader concept of the invention. It is contemplated, for example, that under certain conditions, satisfactory operation of the multiple lift may be obtained by eliminating the transverse partition 24 entirely, or by providing suitable openings in the partition, so that a portion of the gas in the plenum chamber 25 may flow downwardly with the catalyst through passage 32. It is also contemplated that the lift gas may be introduced entirely through the diffuser inlets 18 or entirely through the annuli 33.

If it is desired to further increase the pressure drop provided by the catalyst mass, suitable partitions may be placed vertically in the lower region of the main catalyst distributing section of zone 26, so that migrating gas will have additional vertical distance to travel through the bed before it can pass laterally to an adjacent lift.

What we claim is:

1. In apparatus for pneumatically elevating granular contact material so as to maintain continuous circulation with minimum attrition thereof through a closed system, the combination of a hopper adapted to contain a single compact moving mass of granular material and provided with granular material introduction means in the upper region thereof adapted to maintain a constant level of granular material within said hopper, a plurality of lift pipes extending upwardly from a low level within the region of said hopper occupied by said compact moving mass to the desired level of elevation, the lower inlet ends of said lift pipes being so segregated within said compact moving mass that the paths of least resistance for gas flowing between adjacent lift inlets lie wholly within said compact moving mass and are of such length as to provide a substantial resistance to any migration of gas between adjacent lift inlets within a predetermined range of fluctuation in the pressure differential therebetween set in accordance with desired operating conditions, and means for introducing individual confined streams of lift gas in uniform distribution from a common source into said compact moving mass in the regions adjacent to the lower ends of said lift pipes, said uniform distribution being effected by constricting means for providing a substantial pressure drop in each of said confined streams.

2. Apparatus as defined in claim 1 in which at least a portion of said lift gas introduced into said mass is discharged downwardly as an individual annular stream about the lower perimeter of each of said lift pipes.

3. Apparatus as defined in claim 2 including means for introducing an individual stream of additional lift gas into said compact moving mass discharging axially upward from a location within said mass below the inlet of each of said lift pipes.

4. In apparatus for pneumatically elevating granular contact material so as to maintain continous circulation with minimum attrition thereof through a closed system, the combination of: a hopper having a plurality of elongated wells at the lower end; individual lift pipes extending from a low point within said wells upwardly through said hopper to the desired point of elevation above the same; spaced sleeves surrounding the lower ends of said lift pipes to form annular paths therebetween, said paths being in open communication with said hopper adjacent to the lower ends of said lift pipes; granular material inlet means in the upper region of said hopper; means for introducing lift gas from a common source of distribution into the upper end of said annular paths; and inlet means in the lower end of said wells for injecting additional streams of gas from a second common source of distribution axially upward toward the open lower ends of said lift pipes; said annular paths being adapted to provide a substantial pressure drop in each of said annular streams to thereby effect uniform distribution of gas from said common source; and said granular material inlet means being arranged to maintain a mass of granular material within said hopper and said wells at a level sufficiently above the upper ends of said wells so that the paths of least resistance to gas flow between adjacent lift pipe inlets lie wholly within said mass.

5. Apparatus as in claim 4 in which said inlet means for introducing additional streams of gas into the lower region of said wells also are adapted to provide a substantial pressure drop in said additional streams so as to effect uniform distribution of gas from said second common source.

6. In apparatus for pneumatically elevating granular contact material so as to maintain continuous circulation with minimum attrition thereof through a closed system, the combination of: a hopper adapted to contain a compact moving bed of said granular material; means forming a plurality of wells having their upper ends in constant open communication with said hopper; a plurality of lift pipes individual to said wells and extending centrally upward from a low level therein to the desired level of elevation; means for introducing granular material into said hopper as a compact moving stream discharging directly onto the surface of said bed; said wells and said lift pipes being so arranged that said granular material is continuously passed from the bottom of said bed into said wells and passes downwardly within the wells as a compact moving column around and below the lower end portion of each of said lift pipes; means for introducing at least one stream of lift gas from a common source into the lower region of each of said wells so as to engage said granular material and convey the same to and through said lift pipes; and means for providing a substantial pressure drop in each of said streams of lift gas so that fluctuations in the static pressure adjacent to the inlet of one lift pipe will not result in any substantial variation in the distribution of lift gas thereto; the arrangement of said compact moving bed with respect to said compact moving columns supplied therefrom being such that the path of least resistance to gas flow between adjacent lift pipe inlets resulting from said fluctuations in static pressure lies wholly within a continuous compact moving mass of said granular material, said resistance to gas flow being set for a predetermined range of fluctuation in pressure differential, at a given gas flow, between adjacent lift pipe inlets in accordance with desired operating conditions.

7. Apparatus as in claim 6 in which said wells are directly at the bottom of said hopper; said lift pipes pass upwardly through said hopper; and at least the primary portion of said lift gas is conveyed into said wells through confined annular paths extending downwardly around the lift pipes from a common source comprising a plenum chamber located at the top of said hopper above the surface of said bed.

8. Apparatus as in claim 7 in which the pressure drop in the streams of lift gas flowing from said plenum to said wells is provided by orifice means located within each of said annular confined paths.

9. Apparatus as in claim 6 in which said lift gas is introduced to the lower region of said wells in two streams; the primary stream of gas being uniformly distributed from one common source and introduced downwardly about the lower perimeter of each lift pipe, and the secondary stream of gas being uniformly distributed from a second common source and introduced axially upward from the bottom of each well toward the inlet of its lift pipe.

10. In apparatus for pneumatically elevating granular contact material so as to maintain continuous circulation with minimum attrition thereof through a closed system, the combination of: a hopper adapted to contain a compact moving bed of said granular material; means in the upper region of said hopper for continuously supplying granular material directly to the surface of said bed; a plurality of upright cylindrical vessels below said hopper adapted to contain individual compact moving columns of said granular material; means for passing said granular material in compact flow from said bed to said individual columns; a plurality of lift pipes extending upwardly from a low level within said columns to a discharge location at the desired elevation; means for introducing streams of lift gas from a common source into said columns at locations near the lower end of said lift pipes, the length of said columns and the horizontal distance within said bed between the upper ends of adjacent columns being such as to impose a substantial resistance to undesired flow of gas between adjacent lift pipe inlets as a consequence of a pressure differential therebetween during periods of fluctuation in the flow of granular material through one of said lift pipes; said resistance to undesired gas flow being set for a predetermined range of variation in pressure differential between said adjacent inlets in accordance with desired operating conditions, and said means for introducing lift gas from said common source into said columns being constricted to provide in said streams a substantial pressure drop in excess of the maximum pressure differential normally to be expected between adjacent lift inlets as a result of said fluctuation.

References Cited in the file of this patent

UNITED STATES PATENTS

| | | |
|---|---|---|
| 1,390,974 | Von Porat | Sept. 13, 1921 |
| 1,549,285 | Baker | Aug. 11, 1925 |
| 2,493,911 | Brandt | Jan. 10, 1950 |

FOREIGN PATENTS

| | | |
|---|---|---|
| 7,075 | Netherlands | Mar. 18, 1922 |